Patented Sept. 23, 1930

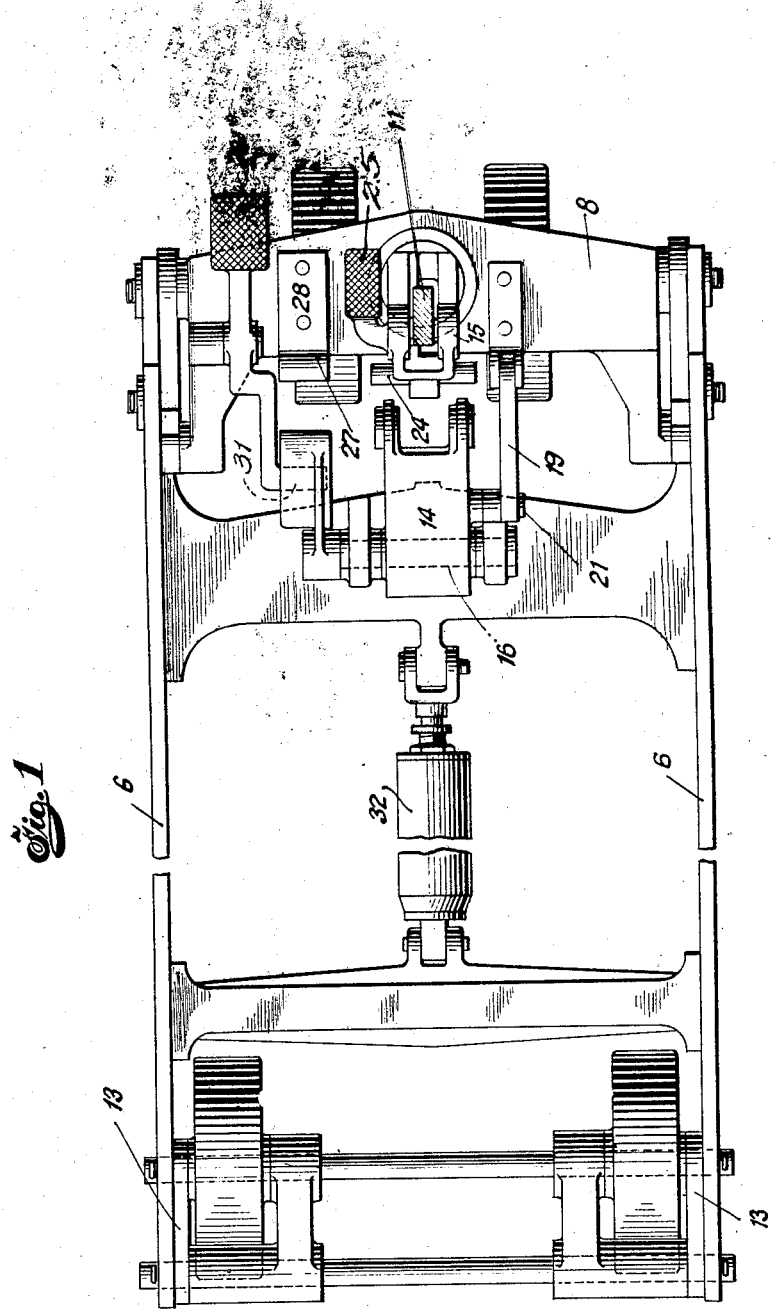

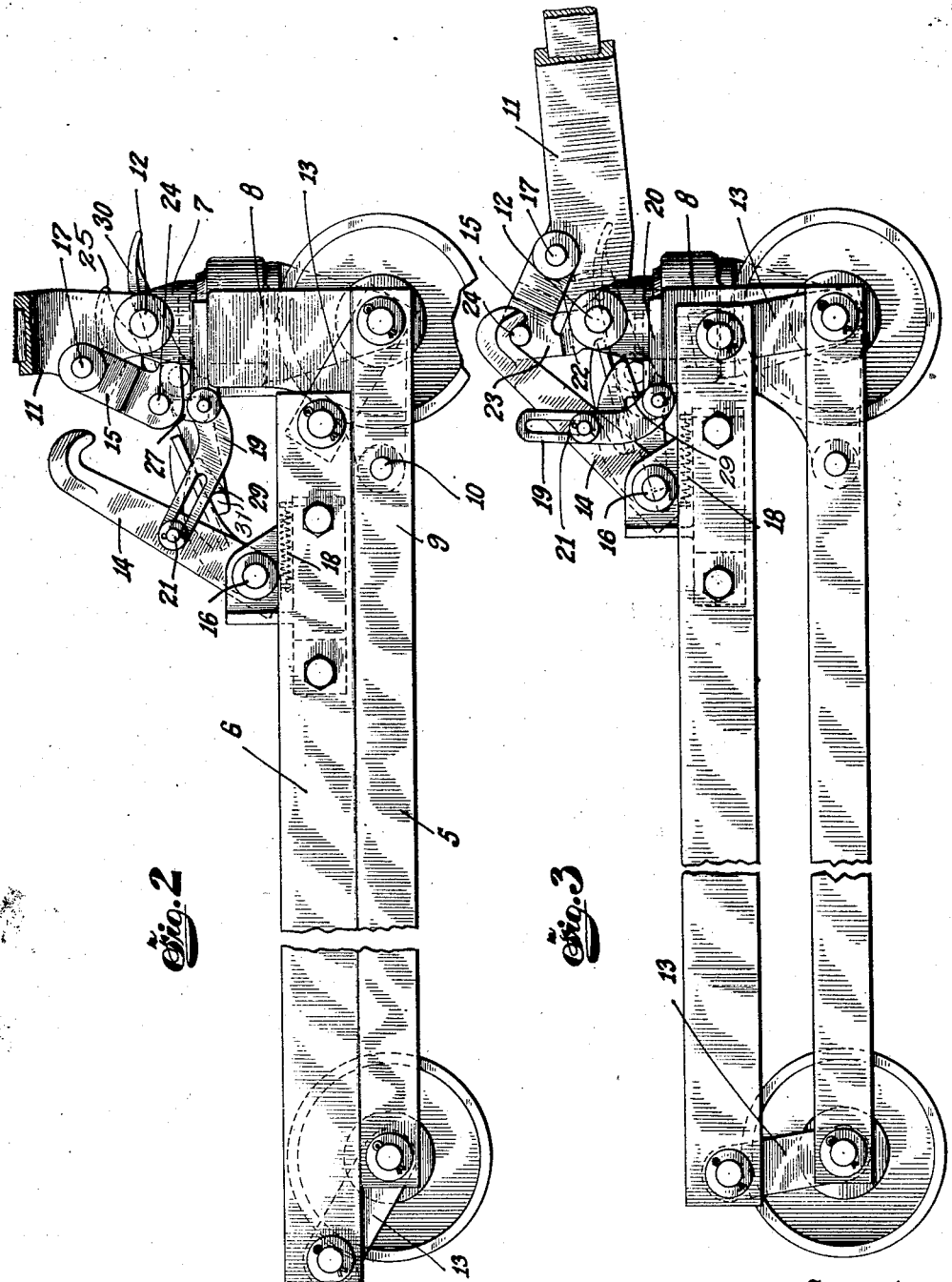

1,776,523

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFTING TRUCK

Application filed January 21, 1926. Serial No. 82,677.

The present invention has for an object to provide a lifting truck having improved lifting mechanism.

It is desirable that the entire swinging movement of the steering handle from vertical to horizontal position shall be made use of in lifting the load, but if the connection between the elevating frame and steering handle is so arranged as to be pivoted to the steering handle only at one point, then the effectiveness of the steering handle operating as a lever changes substantially during the operative movement as the point of attachment of the connections moves through an arc of 90°. The present invention provides an arrangement whereby after the point of attachment of the lifting connections has moved through an arc of approximately 45°, the point of pivotal attachment to the steering handle is in effect changed so far as the operation is concerned, so that a more satisfactory mechanical movement is provided.

The arrangement provided by the invention in its preferred form provides a mechanical movement in which the effective leverage between the steering handle and the link connected to the elevating frame is within desirable limits during all parts of the lifting operation.

The nature and object of the invention will be better understood from the description of a particular illustrative embodiment for the purposes of which description reference should be had to the accompanying drawing forming a part hereof, and in which:

Figure 1 is a plan view of a lifting truck constructed in accordance with and embodying the principles of the invention.

Fig. 2 is a side view of the structure shown in Fig. 1, the elevating platform being shown in both cases in its lowermost position.

Fig. 3 is a side view of the structure showing the elevating platform in elevated position.

The truck shown for the purpose of illustrating the invention has a main frame 5 and a load supporting elevating frame 6 carried thereby. A steering head 7 is rotatably mounted in a transverse yoke 8 forming a part of the main frame and to which yoke the side bars 9 of the main frame are rigidly connected as by means of bolts 10. A steering handle 11, pivoted at 12 to the steering head, is provided for hauling the truck.

The elevating frame is supported on the main frame by means of similar links 13 pivotally connected to the main frame at the front and rear ends thereof, and is connected to be lifted by operation of the steering handle in a vertical plane when the steering head is in substantially its straight-forward position. The connection for this operation is so arranged as to provide in effect two lever arms positioned at an angle to each other, on the steering handle and arranged to operate in succession.

This is accomplished in the structure illustrated by providing interengageable links 14, 15 pivoted to the elevating frame at 16 and to the steering handle at 17 respectively and having, in operation, limited angular movement relative to the steering handle. The link 14 is normally urged to the disengaged position indicated in Fig. 2 by the spring 18 acting upon its lower end, but its movement is limited by the link 19 pivoted to a bracket 20 on the main frame yoke 8 and having a pin and slot connection to the link as indicated at 21. Movement of the link 15 relative to the steering handle is limited by a stop 22 on the handle which is engaged by a corresponding stop 23 on the link. In this arrangement the distance between the pivot 12 of the steering handle and the pivot pin 17 constitutes the effective length of a lever arm for the first portion of the lifting operation and the distance between the pivot point 12 and the pin 24 in its limit position constitutes the effective length of a lever arm for the latter portion of the lifting operation. The particular arrangement will be determined by the relative amount of power required or desired for the different parts of the lifting movement. As shown, the two effective lever arm lengths are substantially equal and the first arm acts through an angle of approximately 45 degrees before the stops 22 and 23 engage and the second effective lever arm comes into action to complete the lifting movement.

The links 14 and 15 tend normally to disengage, the link 15 falling away from the link 14 by gravity and the link 14 tending to move up out of engaging position under the action of the spring 18 but the uppermost position of the link 14 is such that it can easily be engaged by the link 15 when the operator moves the latter by means of the pedal extension 25.

A suitable lock is provided to maintain the elevating platform in its uppermost load supporting position. As shown, a hook 27 is mounted at 28 on the yoke 8 of the main frame and it cooperates with a hook 29 pivoted on a pin 16 on the elevating frame. The hook 29 is disengaged from hook 27 by an arm 31 forming part of a lever having a pedal extension 30 extending within convenient reach of the operator. The two hook members are constructed and arranged to engage automatically when the elevating frame is lifted and they may be disengaged by stepping on the pedal extension 30 whereupon the arm 31 lifts the hook 29 in a manner to cause disengagement and to permit lowering of the lifting frame.

In view of the fact that the supporting links 13 are in a substantially vertical position when the load is in its elevated position, there is relatively little pressure between locking members, and little resistance is offered to disengagement thereof.

A suitable check and spring return device 32 is provided between the two frames to retard the lowering movement of the elevating frame as is usual in trucks of this type.

The description of the particular embodiment of the invention is illustrative merely and is not intended as defining the limits of the invention.

I claim:

1. A lifting truck comprising in combination a main frame having a swivelled steering head, a steering handle pivoted to the steering head, an elevating frame movably supported on the main frame, connecting means between the elevating frame and the steering handle for lifting the former and comprising a link pivoted to the elevating frame, a link pivoted to the steering handle and means for releasable pivotal connection of one of said links with the other, one of said links having means for limiting the extent of its angular movement relatively to the steering handle, and means to engage and disengage said links.

2. A lifting truck comprising in combination a wheeled frame having a swivelled steering head, a steering handle pivoted to the steering head, an elevating frame movably connected to the wheeled frame, connections between the elevating frame and steering handle comprising interengageable separable links, one pivoted to the elevating frame and the other pivoted to the steering handle means to engage and disengage said links, the latter link being engageable with a shoulder of the steering handle to limit its pivotal movement relative thereto during the lifting operation, substantially as and for the purpose described.

3. A lifting truck comprising in combination a wheeled frame having a swivelled steering head, a steering handle pivoted to the steering head, an elevating frame movably connected to the wheeled frame, interengageable links carried by the elevating frame and steering handle respectively, means for moving one link into and out of engagement with the other link and means for limiting the movement of the steering handle link with respect to said handle during the elevating operation to provide in effect two lever arms operating at different angles.

4. A lifting truck comprising in combination a wheeled frame having a swivelled steering head, a steering handle pivoted to the steering head, an elevating frame movably connected to the wheeled frame, connections between the elevating frame and the steering handle comprising links pivotally connected respectively to the elevating frame and the steering handle and to each other, means for engaging and disengaging said links and means for limiting the pivotal movement of the link connected to the handle relative to the steering handle to provide in effect two lever arms during the lifting operation.

5. A lifting truck comprising in combination a wheeled frame having a swivelled steering head, a steering handle pivoted to the steering head, an elevating frame movably connected to the wheeled frame, connections between the elevating frame and steering handle comprising a link pivotally connected to the elevating frame and a second link cooperating therewith, means for limiting pivotal movement of said second link relative to the steering handle during elevating movement thereof and means for breaking the connection between said links upon backward movement of the handle at the end of the lifting movement.

6. A lifting truck comprising in combination a wheeled frame having a swivelled steering head, a steering handle pivoted to the steering head, an elevating frame movably connected to the wheeled frame, connections between the elevating frame and steering handle comprising links adapted to be engaged and disengaged, and means for limiting angular movement of one of said links relative to the steering handle during elevating movement thereof, substantially as described.

In testimony whereof, I have signed my name to this specification this seventeenth day of December, 1925.

WILLIAM STUEBING, Jr.